United States Patent
Nigade et al.

(10) Patent No.: US 9,600,553 B1
(45) Date of Patent: Mar. 21, 2017

(54) DISTRIBUTED REPLICATION IN CLUSTER ENVIRONMENTS

(71) Applicant: Symantec Corporation, Mountain View, CA (US)

(72) Inventors: Vinod Nigade, Daund (IN); Mahesh Soundalgekar, Pune (IN)

(73) Assignee: Veritas Technologies LLC, Mountain View, CA (US)

(*) Notice: Subject to any disclaimer, the term of this patent is extended or adjusted under 35 U.S.C. 154(b) by 218 days.

(21) Appl. No.: 14/292,898

(22) Filed: May 31, 2014

(51) Int. Cl.
*G06F 17/30* (2006.01)

(52) U.S. Cl.
CPC .............. *G06F 17/30584* (2013.01)

(58) Field of Classification Search
CPC combination set(s) only.
See application file for complete search history.

(56) References Cited

U.S. PATENT DOCUMENTS

| 8,285,956 | B2* | 10/2012 | Ozdemir | G06F 11/2066 711/162 |
| 9,077,580 | B1* | 7/2015 | Randhawa | H04L 29/06 |
| 2009/0030986 | A1* | 1/2009 | Bates | G06F 3/065 709/205 |

* cited by examiner

*Primary Examiner* — Etienne Leroux
(74) *Attorney, Agent, or Firm* — Campbell Stephenson LLP (57) ABSTRACT

Various systems and methods for dividing, accessing, and sending portions of a data structure from one node to another for replication from a primary site to a secondary site are disclosed. The method includes dividing a data structure into portions. The data structure stores information identifying which regions of a data volume have been modified and nodes in a cluster share access to the data volume. The nodes and the data volume are located at the primary site. The method also includes sending a first portion of the data structure to a second node in the cluster. The sending causes the second node to replicate the data identified in the portion of the data structure from the data volume to the secondary site. In one embodiment, the accessing and the sending are performed by a logowner node.

17 Claims, 6 Drawing Sheets

DISTRIBUTED REPLICATION IN CLUSTER ENVIRONMENTS

FIELD OF THE INVENTION

This invention relates to data replication and, more particularly, to data replication in cluster storage environments.

DESCRIPTION OF THE RELATED ART

Data replication involves making duplicate copies of data and storing these copies in geographically distinct locations. Data replication can improve reliability, fault-tolerance, and/or accessibility. The purpose of data replication is to prevent data loss if failures or disasters occur in one location. If such failures or disaster do occur that destroy or damage a copy of the data in one location, the copy of the data at a secondary site can be accessed. Accordingly, by maintaining multiple copies of data in different locations, replication can improve a system's ability to recover from data loss, even after a disaster or other failure.

A cluster includes multiple interconnected computers that appear as if they are one computer to end users and applications. Each interconnected computer in the cluster is called a node. The combined processing power of multiple nodes can provide greater throughput and scalability than is available from a single node. In clustered environments, multiple nodes can share a storage device for the purpose of data storage, replication and deduplication. A shared storage disk/device (e.g., a Cluster Shared Volume (CSV)) containing a data volume and a log volume can be made accessible for read and write operations by all nodes within a cluster. Each cluster can have multiple CSVs.

In a clustered environment, where multiple nodes at the primary replication site share access to a storage device, the time required to replicate data from the primary site to a secondary site depends on the size and the number of data volumes associated with the shared storage device at the primary site. Typically, replication is handled in an iterative manner and is performed by a single node in the cluster. However, in such situations, the rate of application writes originating from the various nodes in the cluster is often greater than the replication rate. As a result, the storage device at the secondary site cannot be maintained in an up-to-date state. Consequently, in the case of failure and/or disaster at the primary site, an application running on the various nodes in the cluster cannot be restarted from the data maintained at the secondary site without data loss.

Moreover, encumbering a single node in the cluster with the responsibility of performing replication for all application writes being generated in the cluster leads to that node being a bottleneck, which can in turn degrade system and network performance. Because replication from a single node happens in readback mode (e.g., by reading a value from memory and writing a changed value back to that memory), the single node cannot get the application writes directly from the memory of any of the other nodes in the cluster that are generating the application writes. Therefore, the single node must access the write data from a shared data volume. Even a dedicated replicator node can cause excessive readback which hampers application writes. In Flexible Shared Storage (FSS) clusters, where multiple nodes in a cluster share one or more CSVs, adding a new replicator node can also burden system and network performance because the new replicator node may not have direct connectivity to the data and log volumes of the shared storage device in the primary site.

SUMMARY OF THE INVENTION

Various systems and methods for dividing, accessing, and sending portions of a data structure from one node to another for replication from a primary site to a secondary site are disclosed. The method includes dividing a data structure into portions. The data structure stores information identifying which regions of a data volume have been modified and nodes in a cluster share access to the data volume. The nodes and the data volume are located at the primary site.

The method also includes sending a first portion of the data structure to a second node in the cluster. The sending causes the second node to replicate the data identified in the portion of the data structure from the data volume to the secondary site. In one embodiment, the accessing and the sending are performed by a logowner node.

In other embodiments, the modifications to the regions of the data structure are caused by write operations generated by the nodes in the cluster. The data structure is a portion of a log maintained by the logowner node. The log indicates an order in which the write operations modified the data volume.

In one embodiment, the data structure is a bitmap. The method includes identifying, in a second bitmap, write operations that modify the data volume while the dividing and the sending are being performed, and copying the value of the second bitmap to the bitmap, subsequent to receiving an acknowledgement from the second node. The acknowledgement indicates that the second node has replicated the data identified in the portion of the data structure to the secondary site. The method repeats the dividing and the sending subsequent to the copying.

In some embodiments, the method detects a first write operation that modifies the data volume and replicates the first write operation to the secondary site. Detecting and replicating the first write operation are performed by the second node. The method then detects a second write operation that modifies the data volume and replicates the second write operation that modifies the data volume. Detecting and replicating the second write operation are performed by the logowner node.

In other embodiments, the method detects a first write operation that modifies the data volume and detects a memory pressure situation. The method then creates a multi-update data structure that comprises information that identifies the first write operation. The multi-update data structure is processed and includes information identifying the first write operation and information identifying a second write operation. The processing includes reading data modified by the first write operation and the second write operation and replicating the data to the secondary site.

In one embodiment, the data structure is a bitmap. The dividing and the sending are performed in response to detecting that a log is about to overflow. The log identifies modifications to the data volume and an order in which the modifications occurred. The bitmap identifies modifications that occurred after detecting that the log is about to overflow.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

There are many threats that organizations face today when it comes to the reliability and viability of their data. Logical corruption, or loss of data due to threats such as viruses and software bugs, can be avoided by ensuring that there is a viable copy of data available at all times. Performing regularly scheduled backups of the organizations' data typically protects against logical types of data loss. Another threat that may result in data loss is component or hardware failure. While most devices have begun to build in redundancy, there are other technologies such as application clustering technologies that can protect against a failure of a component while continuing to enable applications to be available.

Just as the levels of protection for logical and component failures have grown, so has the reliance on the information systems being protected. Many companies now realize that logical and local protection is no longer enough to guarantee that crucial applications will continue to be accessible. Losing access to critical applications can stem from planned downtime, such as complete site maintenance, to unplanned downtime, such as downtime caused by power or cooling loss, to natural disasters, such as fire and flooding, to acts of terrorism or war. The loss of a complete data center facility would so greatly affect an organization's capability to function that organizations strive to establish protection that can maintain availability of critical applications at all times.

Many companies have implemented significant disaster recovery (DR) plans to protect against the complete loss of a facility. Plans can include steps for recovering communication lines, staffing critical functions, recovering data, and restoring business applications at a remote location. Whether motivated by protection against a disaster, a site failure, or a planned site migration, replication technologies make it possible to distribute data for data availability across sites. For example, VERITAS Storage Foundation®, available from Symantec Corporation of Mountain View, Calif., provides replication capabilities over Fibre Channel protocols. For organizations that wish to replicate their data natively over a standard Internet Protocol (IP) network, VERITAS Storage Foundation® VERITAS Volume Replicator® can replicate data to remote locations. Replication technologies provide disaster recovery solutions to help avoid data loss and prolonged downtime if a disaster causes data loss at one location.

Two of the main types of replication are synchronous replication and asynchronous replication. Each uses a different process to arrive at the same goal, and each deals somewhat differently with network conditions. The performance and effectiveness of both depend ultimately on business requirements such as how soon updates must be reflected at the secondary site. Performance is strongly determined by the available bandwidth, network latency, the number of participating servers, the amount of data to be replicated, and the geographical distance between the primary site and the secondary site. In both types of replication, the data at the secondary site is first synchronized with the data at the primary site by copying the entirety of the data at the primary site to the secondary site. Subsequently, any modifications (such as data creation, data modification, data deletion, and the like) to data at the primary site are replicated to the secondary site. These modifications, which are referred to as "write operations" throughout this document, are applied to the secondary site in the same order as they are applied to the primary site. In general, secondary sites are selected to be geographically distant from the primary site from which data is being replicated. An organization can use various criteria to select a secondary site, and as such, a secondary site can be in different cities, state, countries, or otherwise in areas with different political vulnerabilities than the primary site; in areas with different geological vulnerabilities than the primary site; in areas with different weather-related vulnerabilities than the primary site; etc.

Synchronous replication ensures that a write operation has been posted to both the secondary site and the primary site before the write operation is acknowledged to be complete at the application level. This way, in the event of a disaster at the primary site, the data recovered at the secondary site will be an exact copy of the data at the primary site. Synchronous replication produces the exact same data at both the primary and secondary sites. Therefore, synchronous replication guarantees "zero data loss" by replicating write operations atomically. An atomic operation is one that either completes in its entirety or is not performed at all, so atomic replication ensures that either a write is applied to both the primary and secondary sites or the write fails to be applied to either. When doing an atomic replication operation, a write cannot be applied to one, but not all, replication sites. However, since the application transaction must travel to the secondary site(s) and be acknowledged back to the primary site before the application can continue with the next transaction, synchronous replication will cause some application performance impact. Synchronous replication is most effective in metropolitan area networks (e.g., where both a primary site and a secondary site are coupled to the same MAN) with application environments that require zero data loss and can afford some application performance impact. For many other applications, asynchronous replication may be a better alternative in terms of application performance.

There can be many scenarios that can affect the performance of replication in synchronous mode, including the amount of write activity on the system, the performance of the network connecting the primary and secondary sites, and the distance between the two sites. For example, in many configurations, 3 milliseconds of latency can be expected for every 100 miles of distance between the primary and secondary sites. Most configurations that use synchronous replication are set to change to asynchronous mode if the network link is lost between the primary and secondary site, or if network performance degrades below a certain threshold.

Asynchronous replication can eliminate the potential performance problems of synchronous replication methods. In asynchronous replication, the secondary site can lag behind the primary site. During asynchronous replication, application updates are written at the primary site and queued for forwarding to each secondary site as network bandwidth allows. Unlike synchronous replication, the writing application does not suffer from the application performance impact of replication and can function as if replication is not occurring because write operations complete at the application level after being written to the primary site and queued for replication. Asynchronous replication can be used in organizations that can afford minimal data loss but want to reduce application performance impact. Asynchronous replication is often used by organizations that would like to replicate data over a wide area network.

Regardless of the replication mode, in order to be useable for disaster recovery purposes, data at the secondary site should not be corrupt or inconsistent. To ensure that the data is recoverable at the secondary site(s), a replication solution will often attempt to cause the data modifications being replicated to be applied to the secondary site in the same order as they were applied to the primary site. This is called write order fidelity. Without write order fidelity, no guarantee exists that a secondary site will have consistent recoverable data because the data modifications replicated to the secondary site may not be in the same order as they were applied to the primary site. A well-designed replication solution needs to safeguard write order fidelity.

Consistency ensures that, even if the replicated copy of data in a secondary site is not identical to data on a primary site (e.g., updates to the replicated backup copy on secondary storage may lag behind updates to data on primary storage), the replicated data on secondary storage represents a state of the data on the primary site that actually existed at a previous point in time.

Sharing storage (e.g., by implementing a CSV) simplifies storage management by allowing large numbers of nodes (e.g., computers, servers, virtual machines, etc.) to access a common shared disk or set of such disks. Nodes in a cluster coordinate metadata I/O operations to the shared storage via an application-layer network protocol (e.g., Server Message Block (SMB) protocol, Common Internet File System (CIFS), etc.). Read/write operations from the various nodes in the cluster can be passed directly to the shared storage (e.g., Serial attached Small Computer System Interface (SCSI), iSCSI, Fibre Channel, Fibre Channel over Ethernet, etc.) via the aforementioned block-based protocols.

Unfortunately, performing replication in a cluster environment with shared storage presents unique performance challenges. There are a variety of ways in which write-order fidelity can be maintained when performing replication in a cluster environment. Such solutions include, but are not limited to, single-node synchronous replication, synchronous replication to a bunker site (followed by asynchronous replication to the secondary/DR site from the bunker site), and single-node synchronous replication in cluster environments involving Flexible Shared Storage (FSS). However, as will be discussed herein, all three solutions and/or configurations can face performance bottlenecks at least with respect to the following system and network constraints: central processing unit (CPU), memory, I/O bandwidth/IOPs (I/O operations per second), and/or network bandwidth.

A cluster at a primary site typically involves one or more applications that are each running on (or configured to run on, in cases where some nodes are designated as failover nodes that take over execution of an application if another node fails) one or more of the nodes in the cluster. The application shares data with all the nodes in the cluster. Multiple nodes can modify the same shared data (on the primary site). However, because only one node in the cluster (typically called the logowner node, which is the owner of the log of write operations to the shared data) is responsible for sending the application writes to the secondary site, the resources of the particular logowner node can be depleted. In single-node synchronous replication, the rate of application writes originating from the various nodes in the cluster can often be greater than the replication rate that the single node can handle.

In addition to encumbering the logowner node with handling the replication of all application writes from all the nodes in the cluster, replication using this methodology is also hampered by the need to read modified data from shared storage before being able to transfer the modified data to the secondary site. This is because the logowner node has to read the data (to be replicated) from a log volume on shared storage for all modifications initiated by nodes other than the logowner node. The log volume is a circular buffer of writes targeting a storage device and/or volume (or group of such storage devices or volumes). The log volume is maintained by the logowner node. While other nodes may have copies of the write operations they generated in their memories, the logowner node cannot get the writes directly from the memory of any of the other nodes that are generating the writes. Accordingly, to be able to replicate data modified by any other node in the cluster, the logowner node first needs to access the shared storage to get the modified data. This adds additional delay into the replication process and may reduce I/O bandwidth.

Replication can also be performed to a bunker site, which is another site (e.g., a data center) that is geographically proximate to the primary site and thus faces little to no distance related latency, which is delay in replication due to the distance between the primary and bunker sites. In this situation, the log volume from the primary site is replicated to the bunker site in synchronous mode. Although the application on the primary site waits for the replication to finish on the bunker site, data from the bunker site is replicated to the geographically distant secondary site in asynchronous mode. Therefore, before bringing up the application at the secondary site, the remaining data (data which has not yet reached the secondary site from the bunker site, due to being replicated asynchronously) is first replicated to the secondary site from the bunker site. However, because a bunker site requires synchronous replication, every node in the cluster has to shift its writes to the log volume so that the primary/logowner node can replicate those writes to the bunker site. Therefore, even in a bunker site configuration that uses both synchronous and asynchronous replication, overhead resulting from shifting writes to the log volume (for replication to the bunker site) results in performance degradation.

Moreover, in Flexible Shared Storage (FSS) clusters, adding a new replicator node does little to remedy the aforementioned overhead (and performance) related problems because the replicator node may not have direct connectivity to the log volume and/or data volume of the primary site. If this is the case, the new replicator node also has to send its writes to the primary/logowner node for replication.

Distributing Replication Across Nodes in a Cluster

Disclosed herein are methods and systems for a distributed synchronization technique that distributes the replication task across the entire cluster of nodes. Because all nodes or multiple nodes in the cluster participate in replication, system and network performance can be improved.

Figure 1:
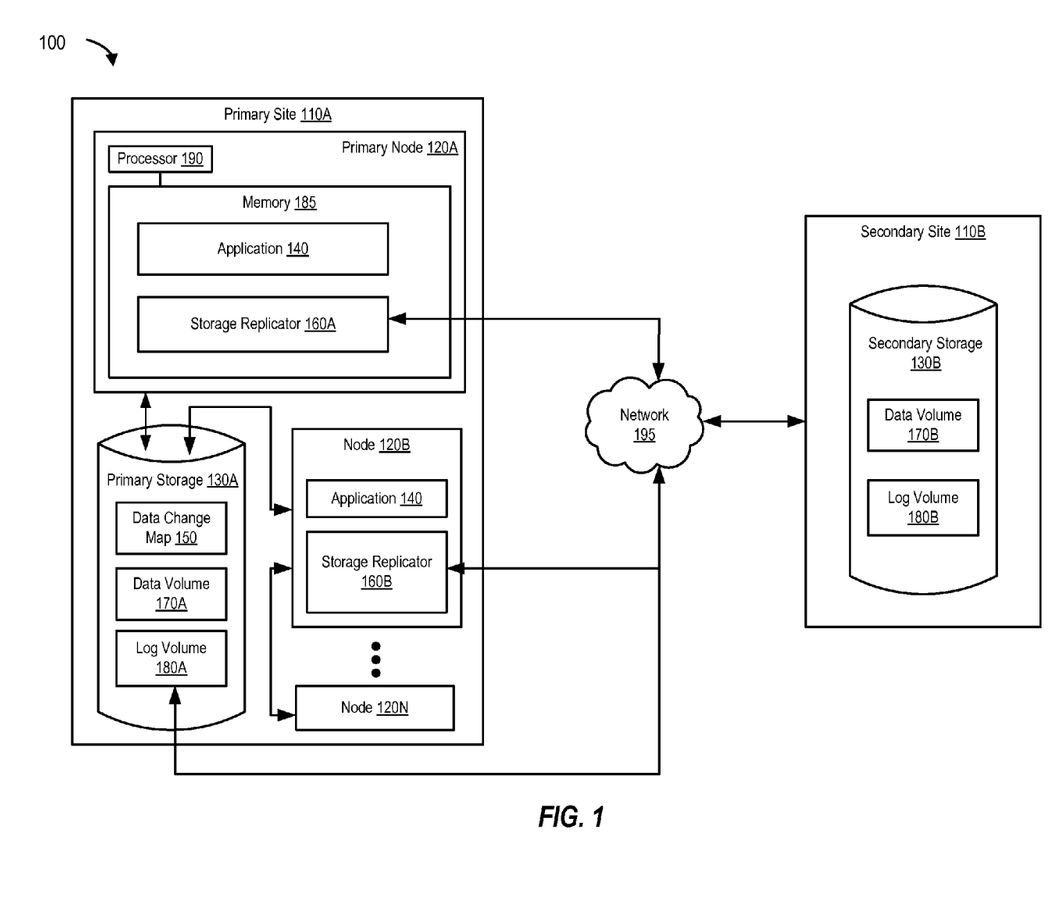
FIG. 1 is a block diagram of a computing system for performing distributed replication from two or more nodes in a cluster, according to one embodiment of the present invention.

FIG. 1 is a block diagram of a computing system for performing distributed replication from two or more nodes in a cluster. The computing system includes a primary site 110A and a secondary site 110B coupled through a network 195. Primary site 110A and secondary site 110B are each located in a different geographical location. Primary site 110A includes a cluster of nodes, which in turn includes primary node 120A and node 120B (and up to node 120N). Primary site 110A also includes primary storage 120A. Primary node 120A is also referred to as "logowner" node and includes a processor 190 and a memory 185. Memory 185 stores application 140 and also contains storage replicator 160A. Similarly, node 120B (which can also be referred to as a "non-logowner" node) runs application 140 and includes storage replicator 160B. Nodes 120A-120N can each be any of a variety of different types of computing devices, including a server, personal computing device, laptop computer, netbook, personal digital assistant, tablet computer, or the like.

Primary node 120A and node 120B are coupled to primary storage 130A which includes a data change map 150, a data volume 170A, and a log volume 180A. Primary storage 130A can include one or more of a variety of different storage devices, including hard disks, compact discs, digital versatile discs, solid state drive (SSD) memory such as Flash memory, and the like, or one or more logical storage devices such as volumes implemented on one or more such physical storage devices.

Primary node 120A and all or part of primary storage 130A can be integrated (e.g., where the primary storage is coupled to the primary node's internal processing devices by an internal bus and is built within the same chassis as the rest of the primary node) or separate. If separate, primary node 120A and primary storage 130A can be coupled by a local connection (e.g., using a technology such as Bluetooth™, Peripheral Component Interconnect (PCI), Small Computer System Interface (SCSI), or the like) or via one or more networks such as the Internet, a local area network (LAN), or a storage area network (SAN).

Here, replication is distributed, such that instead of a single node replicating writes to the secondary site, more than one node is involved in sending writes to the secondary site. A write operation, or simply write, is any application I/O that causes modifications to the application's data (e.g., creation, deletion, etc.). All or multiple nodes on primary site 110A send data (e.g., writes from application 140, which can be executing on one or more of the nodes in the cluster at primary site 110A,) to secondary site 110B from memory. If replication is not able to continue from memory (e.g., memory 185 of primary node 120A), nodes 120A-120N replicate to secondary site 110B by reading data from log volume 180A. This replication task can also be distributed between nodes 120A-120N based on the resources available to nodes 120A-120N.

Primary storage 130A includes a data change map 150, a data volume 170A, and a log volume 180A. Log volume 180A is a circular buffer of writes for a storage device and/or volume (or groups of storage volumes). Primary storage 130A includes log volume 180A and secondary storage 130B includes log volume 180B. In embodiments that use a log volume for replication, writes to data volume 170A in primary storage 130A are first queued in log volume 180A on primary site 110A before they are sent to secondary site 110B. Log volume 180A can be used to track the order of writes to a corresponding data volume 170A in primary storage. There can be one log per volume (or set of volumes), and each log (and the corresponding data volume(s)) has a corresponding logowner node. Each entry in a log volume corresponds to one application write operation and can store information identifying what part of the volume is being modified, what the new value is, and other related metadata. Entries to a log volume are added in the order that the writes occur, such that successive writes will be stored in successive entries. Log volumes 180A and 180B (used to track writes to data volumes 170A and 170B respectively) also help maintain write-order fidelity at the primary site and secondary site respectively, because data modifications being replicated are applied to the secondary site in the same order as they were applied to the primary site.

A data change map (DCM) (e.g., data change map 150) is a bitmap that stores information identifying changed blocks of data. Each bit in a DCM represents a region of the primary volume (e.g., data volume 170A), and the value of each bit indicates whether that region has been modified or not. Each data volume can have a corresponding DCM, and the DCM can be maintained by the logowner node for the corresponding data volume. A DCM can be used to track writes when a log volume overflows. In one embodiment, data change map 150 only becomes active when log volume 180A is no longer large enough to hold accumulated updates. In this example, data change map 150 is associated with data volume 170A on primary storage 130A. When data change map 50 is active, each bit that has been set in data change map 50 represents a region whose contents are different between primary storage 130A and secondary storage 130B. At an appropriate time, an administrator or an automated replicator module (like storage replicator 160A) can initiate a resynchronization to incrementally synchronize secondary storage 130B with primary storage 130A by using the bitmap.

The size of a DCM is based on the size of the data volume associated with the DCM. For example, in one embodiment, the default size of the DCM can range from 4 kilobytes to 256 kilobytes, depending on the size of the associated data volume. A maximum size of the DCM can also be specified by a user. Internally, the DCM can be divided into two maps:

an active map and a replay map. Each bit in the DCM represents a continuous number of blocks in the data volume it is associated with.

As mentioned above, data change map 150 can include two maps: an active map and a replay map. The active map (also referred to as the DCM active map) tracks ongoing write operations and the replay map (also referred to as the DCM replay map) is used to replicate data. Each data volume can have its own DCM (e.g., a per-volume DCM). In certain situations, each node (e.g., nodes 120A-120N) can use all or part of the DCM replay map to replicate a corresponding data volume (e.g., data volume 170A) to secondary site 110B. For incoming write operations, the logowner node (e.g., primary node 120A) updates the DCM active map by setting a bit that corresponds to the region being modified by the write operation to a value that indicates that the targeted region has been modified in the DCM active map of data change map 150.

While application 140 and storage replicator 160A may run on the same computer (or node), such as primary node 120A, the hardware and software configurations represented by primary node 120A may vary. Application 140 and storage replicators 160A may run on different computer systems, data change map 150 may be stored in non-persistent or persistent data storage, and primary storage 130A can be a logical representation of a set of data stored on a logical storage device which may include one or more physical storage devices.

In a clustered environment where storage is shared between multiple nodes (e.g., primary storage 130A), each node has direct connectivity to the log volume. For example, as shown in FIG. 1, primary node 120A and node 120B have direct connectivity to log volume 180A. However, in the case of FSS clusters, a node may not have direct connectivity to a log volume. In FSS clusters, multiple nodes in a cluster can share one or more Cluster Shared Volumes (CSVs). FSS enables cluster wide network sharing of local storage. Local storage can be in the form of Direct Attached Storage (DAS) or internal disk drives. The network sharing of storage is enabled through the use of a network interconnect among the nodes of the cluster. The feature allows network shared storage to co-exist with physically shared storage. Multi-updates, which are described in more detail below, can be used in FSS clusters to ensure continuous distributed replication by sending bulk updates to a node that has direct connectivity to the log volume (e.g., the logowner node).

Further, while connections between application 140, storage replicator 160A and primary storage 130A are shown in relation to primary node 120A, these connections are for illustration purposes only and that other connection configurations are possible. For example, one or more of application 140, storage replicator 160A, data change map 150, and primary storage 130A may be physically outside but coupled to the node represented by primary node 120A. Similarly, as shown in FIG. 1, secondary site 110B and secondary storage 130B are logically and physically isolated from primary storage 130A. An example of a commercially-available storage replicator is VERITAS Volume Replicator® available from Symantec Corporation of Mountain View, Calif.

Initial Synchronization

In one embodiment, data replication starts with initial synchronization. Normally, a log volume maintains ordering information of application writes from the various nodes in a cluster. However, during initial synchronization, because log volume 180A is not initially populated (e.g., it does not yet have the application writes from the various nodes), initial synchronization between primary site 110A and secondary site 110B requires replication using the DCM. During initial synchronization, data in data volume 170A is replicated to secondary site 110B using the DCM replay map. If no synchronization has ever happened before between the two sites, the DCM replay map may have an initial value that indicates that every region of the primary site's data volume should be replicated to the secondary site.

During the initial synchronization process using the DCM, the logowner node and the non-logowner node(s) can separately process write operations (e.g., from application 140). The logowner node (e.g., primary node 120A) is the node tasked with controlling the replication to the secondary site of the particular volume being replicated. The logowner node uses portions of a data structure to distribute replication to other nodes (e.g., the non-logowner node(s)). A data structure stores information identifying which regions of a data volume have been modified. Although the logowner node can send an entire data structure to the non-logowner node for replication to the secondary site, in most embodiments, the non-logowner node (e.g., node 120B) receives only a portion of the data structure from the logowner node and replicates the data identified in the received portion of the data structure to the secondary site. This way, the burden of replication is divided among multiple nodes, instead of being placed on a single node as is normally done.

The process of performing initial synchronization for replication is discussed below. Additionally, it is noted that an application can modify the underlying data volume at the primary site while replication is ongoing. For application writes that occur anytime after initial synchronization (and thus replication) begins, nodes that are writing to the data volume that is being replicated first need to obtain a lock on the region of the data volume being modified by the write operation. This lock is a logical structure that is used to prevent multiple nodes from simultaneously modifying the same data. In some embodiments, a node can obtain the lock from the logowner node for the data volume. Once the node has obtained the lock, the node can add information identifying the write operation to the appropriate log volume and modify the underlying data volume. The node can then acknowledge completion of the write to the application that initiated the write (in some embodiments, this can be done after the write operation has been added to the log volume) and release the lock. The logowner node, in response to detecting that a write operation has been added to the log volume, can set the appropriate bit(s) in the DCM active map to indicate that the corresponding region of the data volume has been modified. In this manner, all write operations are tracked, in the DCM active map and/or the appropriate log volume and can thus be replicated to the secondary site using one of these data structures.

In some embodiments, during initial synchronization, the DCM replay map for data volume 170A is distributed by the logowner node (e.g., primary node 120A) across the cluster of nodes of primary site 110A to nodes which have direct connectivity to data volume 170A (e.g., node 120B in FIG. 1), such that each node receives a portion of the DCM replay map. A portions of the DCM replay map for data volume 170A is received by the non-logowner node (e.g., node 120B). The portions DCM replay map identifies region(s) of the data volume that have been modified (and thus not yet replicated). The non-logowner node reads the regions of data volume 170A that correspond to the bits set in the portion of the DCM replay map, which indicate that the corresponding volume regions have been modified. This modified data is then sent to secondary storage 130B. When all of the regions identified in the portion of the DCM replay map being processed by that node, the non-logowner node sends a message to the logowner node to indicate that its portion of the DCM replay map has been replicated.

Once the logowner receives a message from all of the non-logowner nodes to which the DCM replay map was distributed indicating that replication has been completed, the above process can be repeated for all other data volumes using their corresponding DCM replay maps. In other embodiments, multiple DCM replay maps in the cluster can be used to perform initial synchronization of multiple volumes to secondary site 130B in parallel, for example, without waiting for the replication of one particular volume to finish.

Because the DCM replay map is just a bitmap (e.g., a non-sequential data structure), the DCM replay map does not contain any ordering information to preserve write-order fidelity between the primary site and the secondary site (the DCM is not a log). The DCM replay map only identifies the regions of a data volume in primary storage that are synchronized with secondary storage and the regions that are pending synchronization. Therefore, during initial synchronization using the DCM replay map, secondary storage 130B may not be in a consistent state.

Figure 2A:
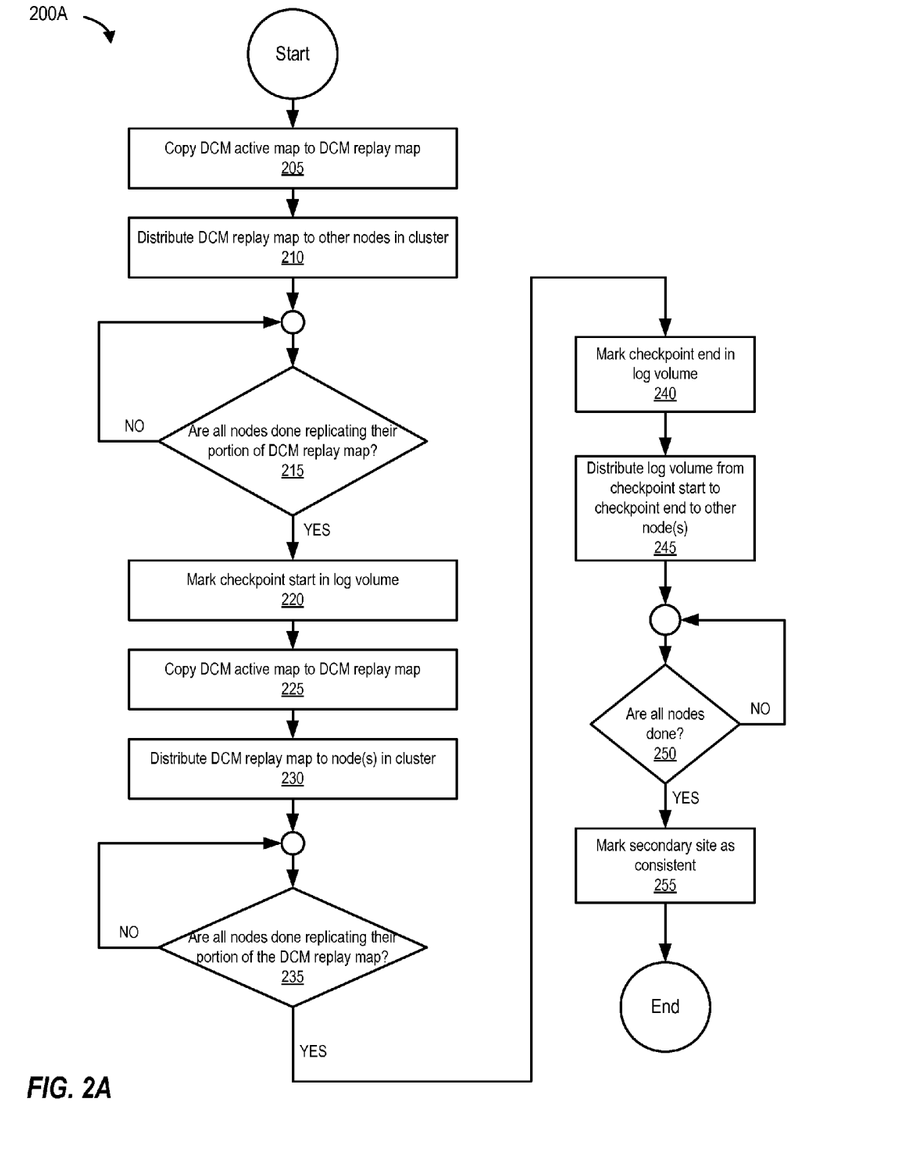
FIG. 2A is a flowchart that illustrates the actions that can be performed by the logowner node during initial synchronization and during replication during log volume overflow, according to one embodiment of the present invention.

FIG. 2A is a flowchart that illustrates the actions that can be performed by the logowner node during initial synchronization (and also during replication during log volume overflow). The method beings at 205 by copying the DCM active map to the DCM replay map. As mentioned briefly above, the DCM active map shows which regions of the volume being replicated have been modified since a prior point in time. This also indicates which regions of the volume being replicated have different values than the corresponding volume at the secondary site. Copying the DCM active map to the DCM replay map resets the DCM active map, such that it effectively begins tracking modifications anew. During initial synchronization, the DCM active map may initially show all regions as being modified (if no synchronization has ever been performed between the primary and secondary sites). In some embodiments, during log volume overflow, the DCM active map can initially show which regions of the volume have been modified since the log overflow occurred.

At 210, the DCM replay map is distributed by subdividing the DCM replay map and providing a portion of the DCM replay map to all or some of the other nodes in the cluster that have connectivity to the data volume corresponding to the DCM replay map. Each node is responsible for replicating the portion of the data volume identified in the received portion of the DCM replay map, and thus replication load is distributed among multiple nodes.

At 215, a determination is made whether all nodes are done replicating their portion of the DCM replay map. Once all nodes have finished with their portion, the first pass of the initial synchronization process is complete.

Once the first pass is complete, the logowner node prepares to begin a second pass of synchronization using the replay maps, which will capture modifications that were made to the data volume at the primary site while the first pass was being performed. In addition, the logowner node will selectively mark a portion of the log volume, using checkpoints, to indicate which portions of the log volume contain modifications that occurred while the second pass is taking place. Thus, at 220, the logowner node marks a checkpoint in the log volume. Marking the checkpoint in the log volume involves adding a checkpoint start entry to the log (e.g., after the most recent entry). This indicates that any entries that are added after the checkpoint start entry should be replicated in the next pass.

At 225, the DCM active map is copied to the DCM replay map (and the DCM active map is reset) and, at 230, the DCM replay map is distributed to the node(s) in the cluster in the same manner as was done at 210. At 235, a determination is made whether all nodes are done replicating their portion of the DCM replay map. If all nodes are replicating their portion of the DCM replay map, the logowner node, at 240, adds a checkpoint end entry to the log volume (e.g., after the most recent entry in the log).

All of the log entries between the checkpoint start and checkpoint end entries identify modifications that were made while the second pass of initial synchronization was being performed. Now, these modifications can be replicated using the portion of the log between the two checkpoints. At 245, the portion of the log volume from the checkpoint start entry to the checkpoint end entry is distributed to the other node(s) by subdividing this portion of the log and sending one portion to each of the nodes that has connectivity with the data volume being replicated. Again, a determination is made at 250 if all nodes are done replicating their portion of the log. If so, the logowner node, at 255, marks the secondary site as consistent (e.g., by setting a flag to a value that indicates that the replicated copy of the data volume secondary site has reached a consistent state relative to the data volume at the primary site).

Figure 2B:
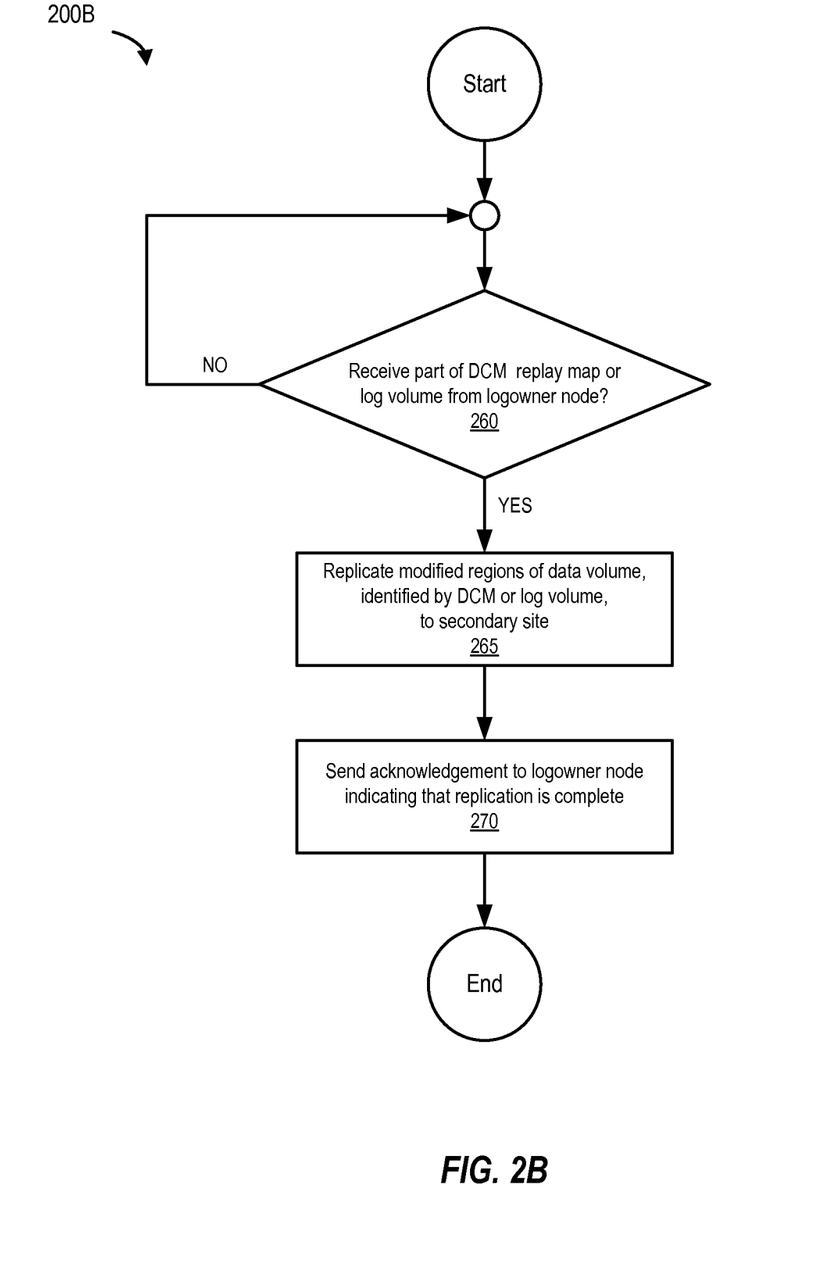
FIG. 2B is a flowchart that illustrates the actions that can be performed by a non-logowner node during initial synchronization of a data volume, according to one embodiment of the present invention.

FIG. 2B is a flowchart that illustrates the actions that can be performed by a non-logowner node during initial synchronization (and also during replication during low volume overflow) of a data volume. The method beings at 260 by determining whether the non-logowner node has received part of the DCM replay map or log volume from the logowner node. If the non-logowner node has received part of the DCM or log volume from the logowner node, at 265, the non-logowner nodes replicates the modified regions of the data volume, as identified by the DCM or log volume, to the secondary site. At 270, an acknowledgement is sent to the logowner node indicating that replication is complete.

Normal Distributed Replication

After performing initial synchronization, the distributed replication process transitions to normal replication. To introduce and maintain consistency between primary storage 130A and secondary storage 130B, normal replication can be performed using the log volume, which is populated with ordered application writes from the various nodes as they occur, after initial synchronization using the DCM has completed.

During normal replication, storage replicators 160A and 160B intercept write operations by application 140 and replicates changes to data on primary site 110A to secondary site 110B using log volume 180A. Replication is now performed in the order of application writes (in contrast to the unordered replication performed using a bitmap, as is done during initial synchronization). The type of replication performed by storage replicators 160A and 160B can be synchronous and/or, asynchronous, as long as updates are applied such that data in secondary storage 130B is consistent with data in primary storage 130A.

Figure 3:
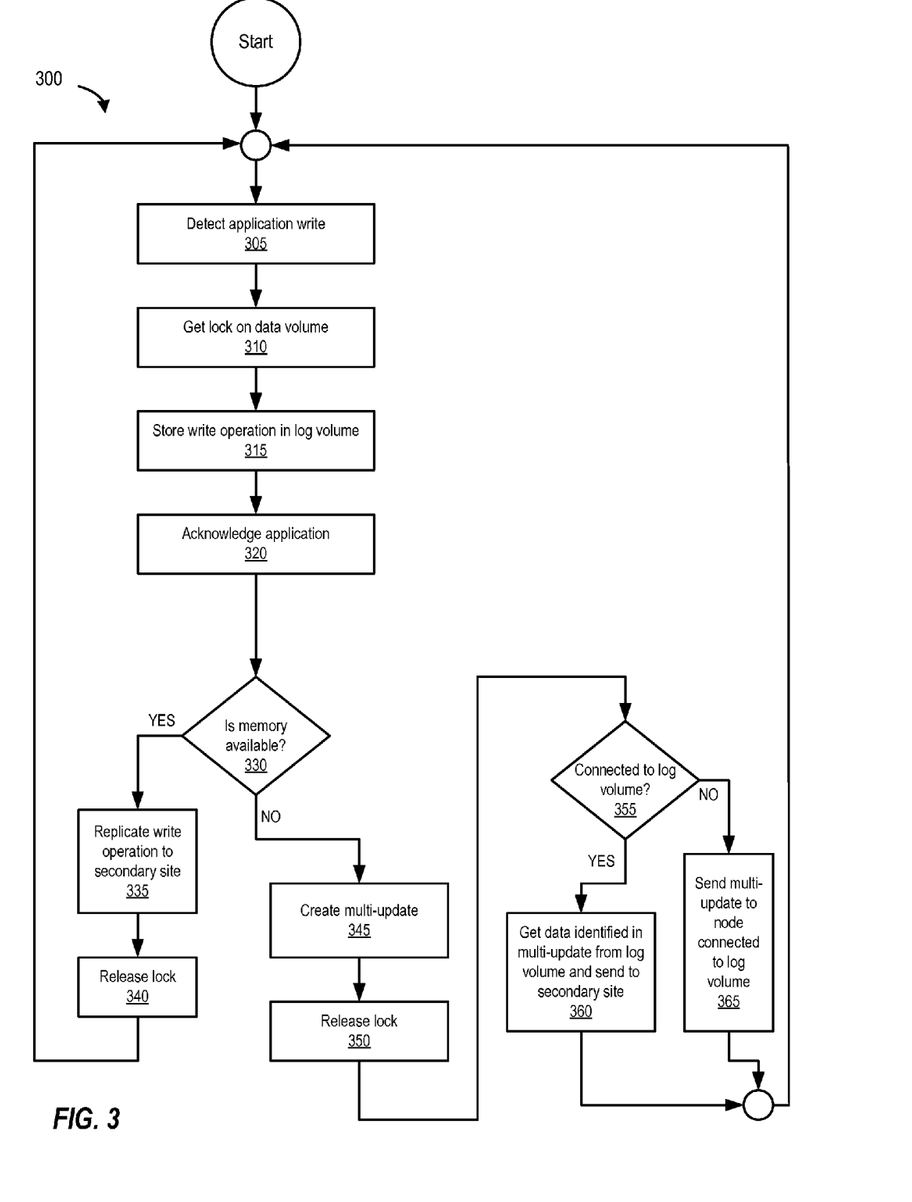
FIG. 3 is a flowchart of a distributed replication method during normal operation, according to one embodiment of the present invention.

FIG. 3 is a flowchart of a distributed replication method during normal operation. This flowchart also shows how, in situations in which node's have memory problems that would otherwise impede normal replication, a technique referred to as multi-update can be used. It is noted that some embodiments may use these distributed replication techniques without implementing multi-update.

This method can be performed by any node, regardless of whether the node is the logowner node or a non-logowner node for the data volume being written to by that node. As explained in detail below, certain operations can be performed slightly differently depending on whether the node is the logowner or not.

The method beings at 305 by detecting an application write. At 310, the method gets a lock on the portion of the data volume being modified by the write operation detected at 305. In one embodiment, the logowner node (e.g., primary node 120A) controls the locks for the data volume. Accordingly, if the node is the logowner, the node can simply obtain the lock locally. If the node is not the logowner, the node can communicate with the logowner node in order to obtain the lock. Once the lock has been obtained, the node can perform the write operation and store information identifying the write operation in the log volume, as shown at 315. Once information identifying the write operation is stored in the log volume, the node can acknowledge completion of the write operation to the application, as shown at 320.

As discussed above, the distributed replication process can involve in-memory replication, in which each node obtains the modified data to be sent to the secondary site from its memory (as opposed to having to having to access the copy of the log stored on the underlying data volume). If an application write is available in the memory of the node (e.g., memory 185 of primary node 120A, or memory of node 120B if node 120B is replicating the application write), the node can send the write directly to the secondary storage (from memory). However, it is foreseeable that a situation can arise where the memory of a node is not able to keep up with the rate of writes being generated by the application, creating excessive memory pressure. This situation is referred to as memory pressure.

In one embodiment, a multi-update is created to remedy the situation involving memory pressure discussed above. For example, if memory in node 120B is over-utilized and cannot keep up with the rate of tasked replication, a multi-update permits node 120B to create a batch of write operations for replication at a later time. At that later time, the node can read the data modified by the writes back from the log volume and then send all of that data (corresponding to multiple writes) to the secondary volume at once. Thus, instead of replicating one write operation at a time, a multi-update allows a node to send data corresponding to multiple write operations to the secondary site at the same time. A multi-update uses metadata that acts as a placeholder for the data to be replicated. For example, the metadata for a single write within a multi-update can include information about the location of the data in the primary storage (e.g., based on log volume 180A) that has yet to be replicated to secondary storage 130B. This metadata can also identify the identifier of the log entry corresponding to the write operation.

A multi-update can include a number of successive write operations. For example, a single multi-update data structure can include several successive write operations handled using the method of FIG. 3. These write operations can be ordered relative to each other using their log entry identifiers.

Accordingly, in embodiments in which multi-updates are supported, normal replication can involve checking for memory pressure situations, as shown at 350, by determining whether memory is available (e.g., whether application writes are available in memory for replicating to the secondary site). If memory is available, at 355, the method replicates writes to the secondary site (directly from memory) and, at 360, releases the region lock (e.g., by communicating with the logowner, if the replicating node is not the logowner).

If memory in unavailable, at 365, the method creates a multi-update and, at 370, releases the region lock. At 375, a determination is made whether the node is still connected to the log volume. If log volume connectivity exists, at 380, the data identified in the multi-updated is extracted from the log volume and sent to the secondary site. If log volume connectivity does not exist, at 385, the multi-update is sent to a node that is connected to the log volume (e.g., the logowner node).

Replication During Log Volume Overflow

In some embodiments, data consistency is maintained between primary site 110A and secondary site 110B by transitioning from normal replication to DCM-based resynchronization in certain situations where replicating from the log volume is not possible. For example, resynchronizing primary storage 130A and secondary storage 130B based on the DCM can become necessary in cases involving log volume overflow.

A situation may arise where the log volume (e.g., log volume 180A) is too full and does not have sufficient space to store the next application write being generated by the various node in the cluster on primary site 110A. At this point, the DCM can be re-introduced. Since subsequent application writes cannot be stored in the log volume, they cannot be replicated in order (to maintain write-order fidelity, and thereby consistency). In this example, when log overflow occurs, application writes are tracked using the DCM active map. Once the log volume becomes available (e.g., after all the data from the log volume has been replicated to secondary storage and the secondary storage is now consistent, thus freeing the log volume's storage space), the DCM maps can be used to resynchronize the primary and secondary sites, using a process like that shown in FIGS. 2A and 2B.

Secondary Site Replication Activity

Returning to FIG. 1, it will be appreciated that secondary storage 130B can also maintain a log volume (e.g., log volume 180B). Because replicated data can be received out of order from primary site 110A, log volume 180B can be useful to maintain write-order fidelity of secondary storage 130B. As noted above, every write operation at the primary site 110A is given an identification number for its corresponding log entry by the logowner node. Write operations generated on different nodes can be ordered relative to each other by the logowner node, as described above, and the logowner node can assign successive log entry IDs to successively ordered writes. These log entry IDs can be sent to the secondary site as part of the replication process. Therefore, even if writes are replicated out of order, secondary storage 130B can order the writes based on their log entry ID numbers.

In other embodiments, multiple nodes can be present on the secondary site that act as receiver nodes. For example, on the primary site, multiple nodes can assume the replication tasks based on the distributed replication process described above. Similarly, multiple nodes can be present on the secondary site to receive writes from the various nodes on the primary site. The task of applying application writes to the data volume on the secondary storage in order can be accomplished by implementing a staging area on the secondary site, for example, by using dedicated nodes as receiver nodes. In one embodiment, a network interface card (NIC) can be installed on both the primary site and the secondary site to facilitate data synchronization and replication.

Distributing data replication in cluster environments can offer performance enhancements and improvements in distributed storage environments including, but not limited to, CPU load balancing for replication, disk throughput improvement by reducing reads on a log volume on primary storage, and reducing memory contention on a primary/logowner node. Distributing replication across various nodes in a cluster can also improve the scalability of a primary site implementing a cluster storage environment.

An Example Computing Environment

Figure 4:
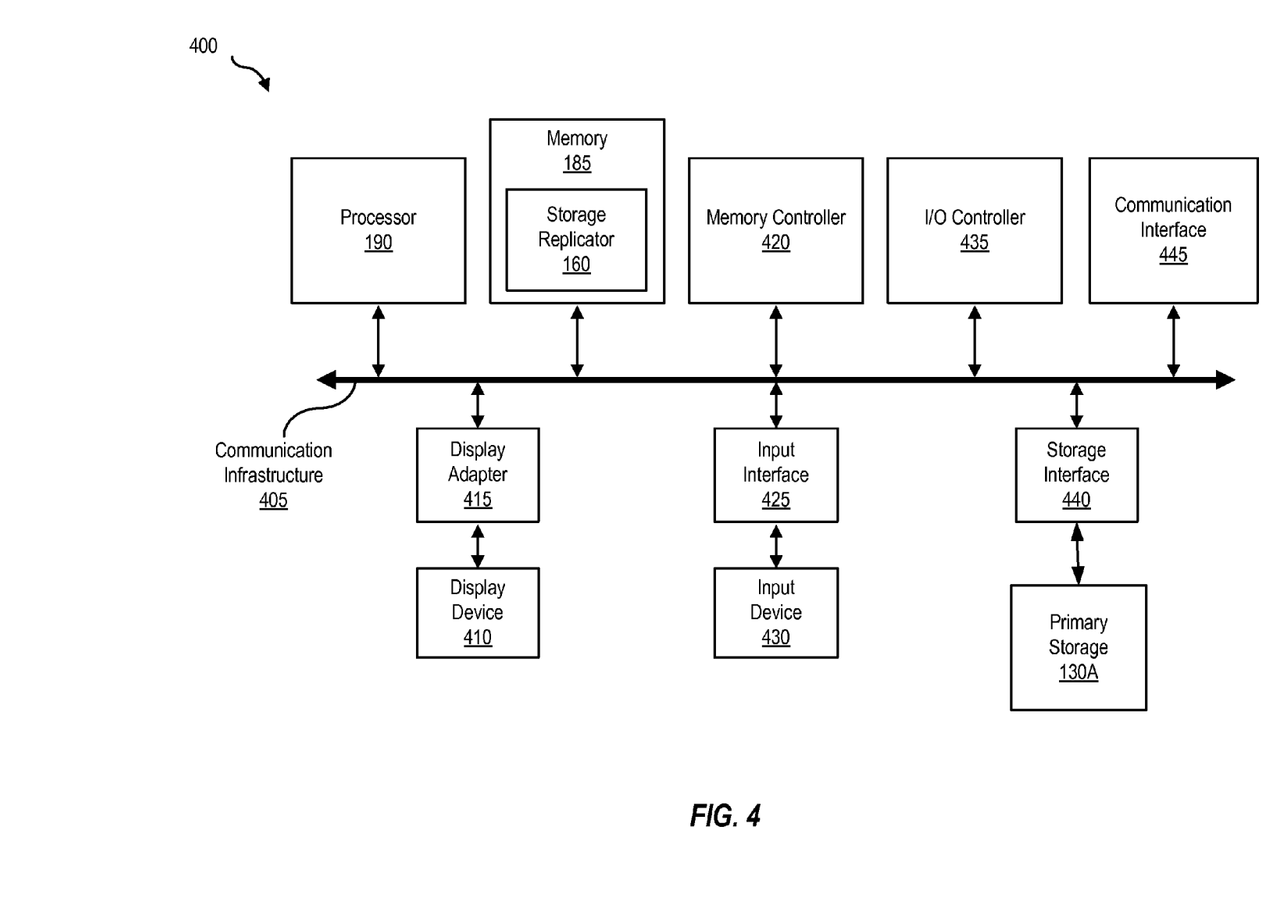
FIG. 4 is a block diagram of a computing device, illustrating how a storage replicator can be implemented in software, according to one embodiment of the present invention.

FIG. 4 is a block diagram of a primary node 120A capable of implementing distributed replication across various nodes in a cluster as described above. Primary node 120A broadly represents any single or multi-processor computing device or system capable of executing computer-readable instructions. Examples of primary node 120A include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, primary node 120A may include at least one processor 190 and a memory 185. By executing the software that implements storage replicators 160A and 160B, primary node 120A becomes a special purpose computing device that is configured to perform continuous distributed replication across various nodes in a cluster.

Processor 190 generally represents any type or form of processing unit capable of processing data or interpreting and executing instructions. In certain embodiments, processor 190 may receive instructions from a software application or module. These instructions may cause processor 190 to perform the functions of one or more of the embodiments described and/or illustrated herein. For example, processor 190 may perform and/or be a means for performing all or some of the operations described herein. Processor 190 may also perform and/or be a means for performing any other operations, methods, or processes described and/or illustrated herein.

Memory 185 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments, primary node 120A may include both a volatile memory unit and a non-volatile storage device. In one example, program instructions implementing a distributed replication operation may be loaded into memory 185.

In certain embodiments, primary node 120A may also include one or more components or elements in addition to processor 190 and memory 185. For example, as illustrated in FIG. 4, primary node 120A may include a memory controller 420, an Input/Output (I/O) controller 435, and a communication interface 445, each of which may be interconnected via a communication infrastructure 405. Communication infrastructure 405 generally represents any type or form of infrastructure capable of facilitating communication between one or more components of a computing device. Examples of communication infrastructure 405 include, without limitation, a communication bus (such as an Industry Standard Architecture (ISA), Peripheral Component Interconnect (PCI), PCI express (PCIe), or similar bus) and a network.

Memory controller 420 generally represents any type or form of device capable of handling memory or data or controlling communication between one or more components of computing system 400. For example, in certain embodiments memory controller 420 may control communication between processor 190, memory 185, and I/O controller 435 via communication infrastructure 405. In certain embodiments, memory controller 420 may perform and/or be a means for performing, either alone or in combination with other elements, one or more of the operations or features described and/or illustrated herein.

I/O controller 435 generally represents any type or form of module capable of coordinating and/or controlling the input and output functions of a computing device. For example, in certain embodiments I/O controller 435 may control or facilitate transfer of data between one or more elements of primary node 120A, such as processor 190, memory 185, communication interface 445, display adapter 415, input interface 425, and storage interface 440.

Communication interface 445 broadly represents any type or form of communication device or adapter capable of facilitating communication between primary node 120A and one or more additional devices. For example, in certain embodiments communication interface 445 may facilitate communication between computing system 400 and a private or public network including additional computing systems. Examples of communication interface 445 include, without limitation, a wired network interface (such as a network interface card), a wireless network interface (such as a wireless network interface card), a modem, and any other suitable interface. In at least one embodiment, communication interface 445 may provide a direct connection to a remote server via a direct link to a network, such as the Internet. Communication interface 445 may also indirectly provide such a connection through, for example, a local area network (such as an Ethernet network), a personal area network, a telephone or cable network, a cellular telephone connection, a satellite data connection, or any other suitable connection.

In certain embodiments, communication interface 445 may also represent a host adapter configured to facilitate communication between primary node 120A and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 445 may also allow primary node 120A to engage in distributed or remote computing. For example, communication interface 445 may receive instructions from a remote device or send instructions to a remote device for execution.

As illustrated in FIG. 4, primary node 120A may also include at least one display device 410 coupled to communication infrastructure 405 via a display adapter 415. Display device 410 generally represents any type or form of device capable of visually displaying information forwarded by display adapter 415. Similarly, display adapter 415 generally represents any type or form of device configured to forward graphics, text, and other data from communication infrastructure 405 (or from a frame buffer, as known in the art) for display on display device 410.

As illustrated in FIG. 4, primary node 120A may also include at least one input device 430 coupled to communication infrastructure 405 via an input interface 425. Input device 430 generally represents any type or form of input device capable of providing input, either computer or human generated, to computing system 400. Examples of input device 430 include, without limitation, a keyboard, a pointing device, a speech recognition device, or any other input device.

As illustrated in FIG. 4, primary node 120A may also include a primary storage 130A. Devices 130A generally represents any type or form of storage device or medium capable of storing data and/or other computer-readable instructions. For example, device 130A may include a magnetic disk drive (e.g., a so-called hard drive), a floppy disk drive, a magnetic tape drive, an optical disk drive, a flash drive, or the like. Storage interface 440 generally represents any type or form of interface or device for transferring and/or transmitting data between primary storage 130A and other components of primary node 120A.

In certain embodiments, device 130A may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Device 130A may also include other similar structures or devices for allowing computer software, data, or other computer-readable instructions to be loaded into computing system 400. For example, device 130A may be configured to read and write software, data, or other computer-readable information. Devices 130A may also be a part of primary node 120A or may be a separate device accessed through other interface systems.

Many other devices or subsystems may be connected to computing system 400. Conversely, all of the components and devices illustrated in FIG. 4 need not be present to practice the embodiments described and/or illustrated herein. The devices and subsystems referenced above may also be interconnected in different ways from that shown in FIG. 4.

Primary node 120A may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 400. All or a portion of the computer program stored on the computer-readable medium may then be stored in memory 185 and/or various portions of devices 130A or 130B. When executed by processor 190, a computer program loaded into primary node 120A may cause processor 190 to perform and/or be a means for performing the functions of one or more of the embodiments described and/or illustrated herein. Additionally or alternatively, one or more of the embodiments described and/or illustrated herein may be implemented in firmware and/or hardware. For example, primary node 120A may be configured as an application specific integrated circuit (ASIC) adapted to implement one or more of the embodiments disclosed herein.

An Example Networking Environment

Figure 5:
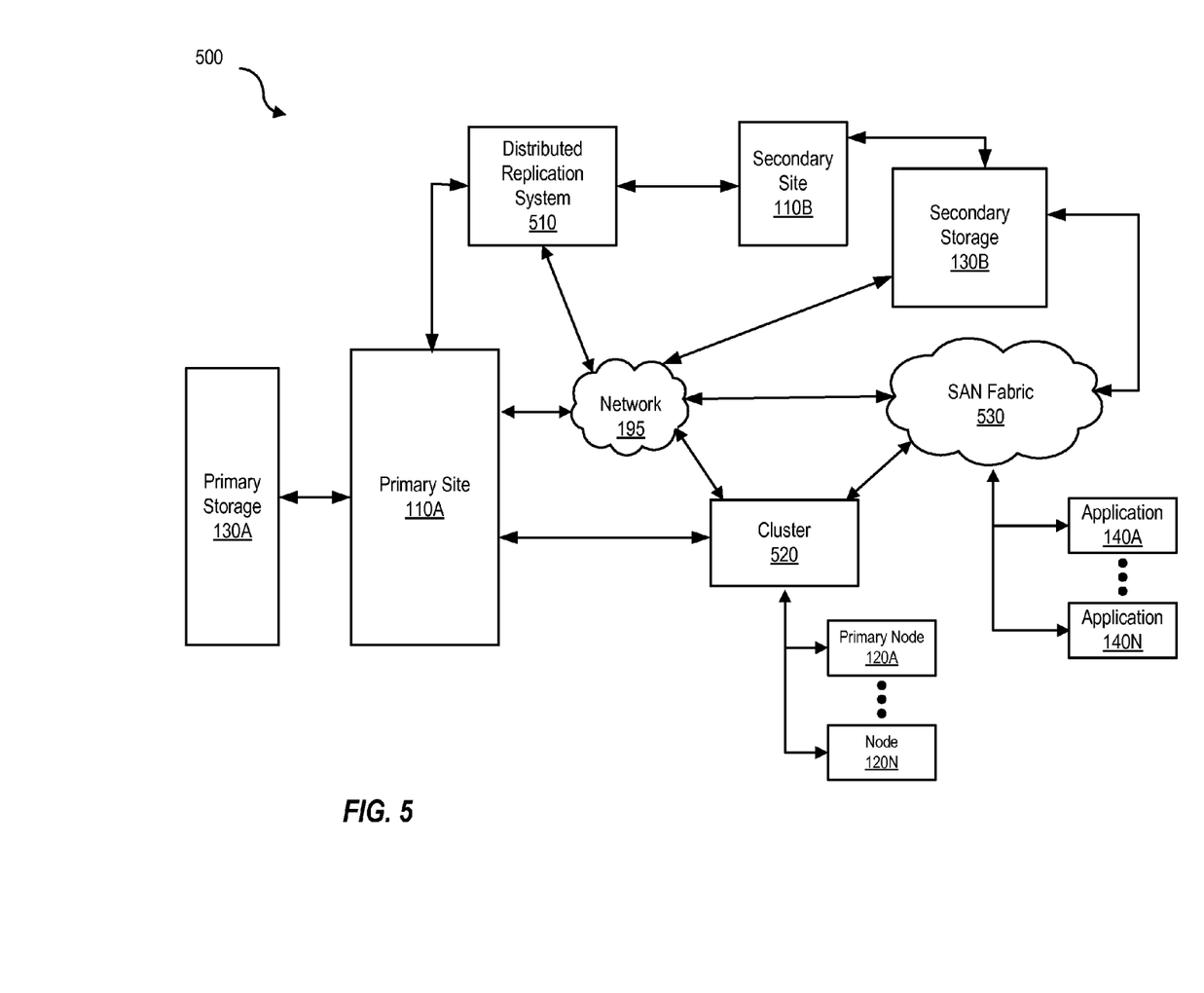
FIG. 5 is a block diagram of a networked system, illustration how various computing devices can communicate via a network, according to one embodiment of the present invention.

FIG. 5 is a block diagram of a network architecture 500 in which primary node 120A and primary storage 130A may be coupled to network 195. As illustrated in FIG. 5, primary storage 130A may be attached to secondary storage 130B through network 195. In certain embodiments, network-attached storage (NAS) devices may be configured to communicate with storage 130A and 130B using various protocols, such as Network File System (NFS), Server Message Block (SMB), or Common Internet File System (CIFS).

Nodes 120A-120N may also be connected to a network 195. Network 195 generally represents any type or form of computer network or architecture capable of facilitating communication between multiple computing devices. Network 50 may facilitate communication between nodes 120A-120N and storage 130A and 130B. In certain embodiments, and with reference to primary node 120A of FIG. 4, a communication interface, such as communication interface 445 in FIG. 4, may be used to provide connectivity between primary storage 130A and network 50. It should be noted that the embodiments described and/or illustrated herein are not limited to the Internet or any particular network-based environment. For example, network 50 can be a Storage Area Network (SAN).

In at least one embodiment, all or a portion of one or more of the embodiments disclosed herein may be encoded as a computer program and loaded onto and executed by nodes 120A-120N, storage 130A, storage 130B or any combination thereof. All or a portion of one or more of the embodiments disclosed herein may also be encoded as a computer program, stored in nodes 120A-120N and distributed over network 195.

In some examples, all or a portion of the nodes in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a pseudo-identity module may transform behavior of a server in order to cause the server and a sequential access media device to communicate with a NAS device.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  dividing a data structure into a plurality of portions, wherein the data structure stores information identifying which regions of a data volume have been modified, a plurality of nodes in a cluster share access to the data volume, and the plurality of nodes and the data volume are located at a primary site;

sending a first portion of the plurality of portions of the data structure to a node of the plurality of nodes in the cluster, wherein the sending causes the node to replicate data identified in the portion of the data structure to a secondary site, and the sending is performed by a logowner node of the plurality of nodes; and detecting that a log will overflow, wherein the log identifies a first plurality of modifications to the data volume and an order in which the first plurality of modifications occurred, and the data structure identifies one or more modifications that occurred after the detecting that the log will overflow.

2. The method of claim 1, wherein the modifications to the regions of the data volume are caused by a plurality of write operations generated by the plurality of nodes, the data structure is a portion of a log maintained by the logowner node, and the log indicates an order in which the write operations modified the data volume.

3. The method of claim 1, wherein the data structure is a bitmap.

4. The method of claim 3, further comprising:

identifying, in a second bitmap, one or more write operations that modify the data volume while the sending is being performed;

copying a value of the second bitmap to the bitmap, subsequent to receiving an acknowledgement from the node, wherein the acknowledgement indicates that the node has replicated the data identified in the portion of the data structure to the secondary site; and repeating the sending subsequent to the copying.

5. The method of claim 1, further comprising:

detecting a first write operation that modifies the data volume;

replicating the first write operation to the secondary site, wherein the detecting and the replicating the first write operation are performed by the node;

detecting a second write operation that modifies the data volume; and replicating the second write operation that modifies the data volume, wherein the detecting and the replicating the second write operation are performed by the logowner node.

6. The method of claim 1, further comprising:

detecting a first write operation that modifies the data volume;

detecting a memory pressure situation; and creating a multi-update data structure that comprises information that identifies the first write operation.

7. The method of claim 6, further comprising:

processing the multi-update data structure, wherein the multi-update data structure comprises the information identifying the first write operation and information identifying a second write operation, and the processing comprises reading data modified by the first write operation and the second write operation and replicating the data to the secondary site.

8. A non-transitory computer readable storage medium storing program instructions executable to:

divide a data structure into a plurality of portions, wherein the data structure stores information identifying which regions of a data volume have been modified, a plurality of nodes in a cluster share access to the data volume, and the plurality of nodes and the data volume are located at a primary site;

send a first portion of the plurality of portions of data structure to a node of the plurality of nodes in the cluster, wherein the sending causes the node to replicate the data identified in the portion of the data structure to a secondary site, and the sending is performed by a logowner node of the plurality of nodes; and detect that a log will overflow, wherein the log identifies a first plurality of modifications to the data volume and an order in which the first plurality of modifications occurred, and the data structure identifies one or more modifications that occurred after the detection that the log will overflow.

9. The non-transitory computer readable storage medium of claim 8, wherein the modifications to the regions of the data volume are caused by a plurality of write operations generated by the plurality of nodes, the data structure is a portion of a log maintained by the logowner node, and the log indicates an order in which the write operations modified the data volume.

10. The non-transitory computer readable storage medium of claim 8, wherein the data structure is a bitmap.

11. The non-transitory computer readable storage medium of claim 10, further comprising:

identifying, in a second bitmap, one or more write operations that modify the data volume while the sending is being performed;

copying a value of the second bitmap to the bitmap, subsequent to receiving an acknowledgement from the node, wherein the acknowledgement indicates that the node has replicated the data identified in the portion of the data structure to the secondary site; and repeating the sending subsequent to the copying.

12. The non-transitory computer readable storage medium of claim 8, further comprising:

detecting a first write operation that modifies the data volume;

replicating the first write operation to the secondary site, wherein the detecting and the replicating the first write operation are performed by the node;

detecting a second write operation that modifies the data volume; and replicating the second write operation that modifies the data volume, wherein the detecting and the replicating the second write operation are performed by the logowner node.

13. The non-transitory computer readable storage medium of claim 8, further comprising:

detecting a first write operation that modifies the data volume;

detecting a memory pressure situation; and creating a multi-update data structure that comprises information that identifies the first write operation.

14. The non-transitory computer readable storage medium of claim 13, further comprising:

processing the multi-update data structure, wherein the multi-update data structure comprises the information identifying the first write operation and information identifying a second write operation, and the processing comprises reading data modified by the first write operation and the second write operation and replicating the data to the secondary site.

15. A system comprising:

one or more processors; and a memory coupled to the one or more processors, wherein the memory stores program instructions executed by the one or more processors to:

divide a data structure into a plurality of portions, wherein the data structure stores information identifying which regions of a data volume have been modified, a plurality of nodes in a cluster share access to the data volume, and the plurality of nodes and the data volume are located at a primary site;

send a first portion of the plurality of portions of the data structure to a node of the plurality of nodes in the cluster, wherein the sending causes the node to replicate data identified in the portion of the data structure to a secondary site, and the sending is performed by a logowner node of the plurality of nodes; and detect that a log will overflow, wherein the log identifies a first plurality of modifications to the data volume and an order in which the first plurality of modifications occurred, and the data structure identifies one or more modifications that occurred after the detection that the log will overflow.

16. The system of claim 15, wherein the modifications to the regions of the data volume are caused by a plurality of write operations generated by the plurality of nodes, the data structure is a portion of a log maintained by the logowner node, and the log indicates an order in which the write operations modified the data volume.

17. The system of claim 15, comprising detecting a first write operation that modifies the data volume;

replicating the first write operation to the secondary site, wherein the detecting and the replicating the first write operation are performed by the node;

detecting a second write operation that modifies the data volume; and replicating the second write operation that modifies the data volume, wherein the detecting and the replicating the second write operation are performed by the logowner node.

* * * * *